US008665741B2

(12) United States Patent
Laurila

(10) Patent No.: US 8,665,741 B2
(45) Date of Patent: Mar. 4, 2014

(54) RADIO FREQUENCY COMMUNICATIONS BASED ON MULTIPLE RECEIVERS

(75) Inventor: Hannu T. Laurila, Oulu (FI)

(73) Assignee: Nokia Corporation, Espoo (FI)

( * ) Notice: Subject to any disclaimer, the term of this patent is extended or adjusted under 35 U.S.C. 154(b) by 291 days.

(21) Appl. No.: 13/065,233

(22) Filed: Mar. 17, 2011

(65) Prior Publication Data

US 2012/0236738 A1  Sep. 20, 2012

(51) Int. Cl.
*G01R 31/08* (2006.01)
(52) U.S. Cl.
USPC ........... 370/252; 370/328; 455/17; 455/550.1
(58) Field of Classification Search
USPC .......................... 455/550.1, 73; 370/252, 328
See application file for complete search history.

(56) References Cited

U.S. PATENT DOCUMENTS

| 7,899,489 | B2 * | 3/2011 | Hidaka et al. .............. 455/552.1 |
| 8,036,605 | B2 * | 10/2011 | Kamizuma et al. .............. 455/73 |
| 2005/0070231 | A1 * | 3/2005 | Jensen ............................ 455/73 |
| 2006/0135071 | A1 * | 6/2006 | Kim ............................. 455/63.1 |
| 2006/0178122 | A1 * | 8/2006 | Srinivasan et al. ......... 455/168.1 |
| 2009/0116510 | A1 * | 5/2009 | Georgantas et al. .......... 370/467 |
| 2010/0061279 | A1 | 3/2010 | Knudsen et al. .............. 370/278 |
| 2011/0003563 | A1 * | 1/2011 | Gorbachov ...................... 455/78 |

FOREIGN PATENT DOCUMENTS

WO  WO-2011/005777 A1  1/2011

OTHER PUBLICATIONS

A Highly integrated IEEE802.11 b/g WLAN transceiver Haiyong Wang, Lei Yang, Zuohai Xu, Yuan Yang, Yujiao Dou, Zhigang Su, Nanjian Wu LHWT Microelectronics Co. Beijing, China 100085.*

"A Highly integrated IEEE802.11b/g WLAN transceiver", Haiyong Wang, et al., IEEE 2005, 4 pgs.
"$3^{rd}$ Generation Partnership Project; Technical Specification Group Radio Access Network; Evolved Universal terrestrial Radio Access (E-UTRA) and Evolved Universal Terrestrial Radio Access Network (E-UTRAN); Overall description; Stage 2 (Release 8)", 3GPP TS 36.300 V8.11.0, Dec. 2009, 148 pgs.
"$3^{rd}$ Generation Partnership Project; Technical Specification Group Radio Access Network; Evolved Universal Terrestrial Radio Access (E-UTRA); User Equipment (UE) radio transmission and reception (Release 8)", 3GPP TS 36.101 V8.7.0, Sep. 2009, 156 pgs.
"$3^{rd}$ Generation Partnership Project; Technical Specification Group Radio Access Network; Evolved Universal Terrestrial Radio Access (E-UTRA); User Equipment (UE) radio transmission and reception (Release 9)", 3GPP TS 36.101 V9.1.0, Sep. 2009, 156 pgs.

* cited by examiner

*Primary Examiner* — Hassan Kizou
*Assistant Examiner* — Hashim Bhatti
(74) *Attorney, Agent, or Firm* — Warrington & Smith

(57) ABSTRACT

Apparatus, methods, and computer program products are disclosed for: selecting a reception path to receive information from a first receiver path through a first receiver portion in a transceiver portion of the apparatus or from a second receiver path in a receiver portion separate from the transceiver portion of the apparatus, wherein both of the first and second receiver paths receive the information using a same frequency band of a same radio access technology; and receiving the information using the selected reception path. Apparatus, methods, and computer program products are disclosed for: transmitting first information using a transmission frequency band of a radio access technology over a transmission path in a transceiver; and, for the radio access technology and a reception frequency band, receiving second information over a receiver path in a secondary receiver, where the transceiver does not have a receiver path configured to receive the reception frequency band.

20 Claims, 6 Drawing Sheets

RADIO FREQUENCY COMMUNICATIONS BASED ON MULTIPLE RECEIVERS

TECHNICAL FIELD

This invention relates generally to radio frequency communications and, more specifically, relates to reception in wireless devices using radio frequency communications.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

- 3GPP third generation partnership project
- dB decibel
- eNB evolved node B
- GSM global system for mobile communications
- HSPA high speed packet access
- LTE long term evolution
- MIMO multiple in, multiple out
- MN matching network
- Node B base station
- OFDMA orthogonal frequency division multiple access
- OMA open mobile alliance
- OTA over the air
- PA power amplifier
- RFIC radio frequency integrated circuit
- RX receiver or reception (also, Rx)
- SAW surface acoustic filter
- SC-FDMA single carrier, frequency division multiple access
- TS technical standard
- TX transmitter or transmission (also, Tx)
- RAT radio access technology
- RF radio frequency
- WCDMA wideband code division multiple access Many wireless devices contain a transceiver that is used for bidirectional radio frequency communication with other wireless devices. Such transceivers have one or more transmitter paths and one or more receiver paths. Because of presence of transmitter power in a duplex filter (a "duplexer" herein) of the transceiver, high transmitter (TX) to receiver (RX) isolation and attenuation requirements are needed. This leads to design challenges and high insertion loss in duplex filter RX path. Duplex filter RX path insertion loss is directly affecting (e.g., degrading) the receiver's sensitivity one to one (dB). More particularly, in a typical receiver, there is a filter before a low noise amplifier (LNA). The noise factor of the passive element (the filter) comes directly from loss of the component, and the first component in chain has a major effect on the noise factor and noise figure for the receiver. The bigger the RF loss before the LNA, the worse the noise figure and the receiver sensitivity.

Transmitter power is also heating the duplex filter, and this is causing frequency drift and additional insertion loss also at RX path of the duplex filter, because the entire component is heated. Duplex filter insertion loss is also higher with high temperature, even without the effect of shifted center frequency. Further, frequency drift and additional insertion loss at the RX side of the duplex filter are degrading sensitivity of the receiver.

Typically, the duplex filter is connected to an antenna switch and the antenna switch is connected to antenna. The antenna switch is used to select which transmitter or receiver path is coupled to the antenna. The antenna is common for both the transmitter and receiver in the transceiver, and it is not possible to fully optimize antenna performance to receiver frequencies without an effect on antenna performance at the transmitted frequency band.

In full duplex systems, the transmitter and receiver of the transceiver are active simultaneously and the transmitter signal is causing, together with spurious signals, intermodulation products directly to the operating band of the receiver. This causes additional impact on RX performance.

In OTA (over the air) performance evaluation of wireless devices, different use cases are tested, such as the following locations where the wireless device could be relative to human proximity:
- free space (i.e., no human proximity);
- in hand;
- beside head; and
- beside head with hand.

The position of antenna is very important to achieve good OTA performance, but it is hard or impossible to find a position for an antenna that is good for all use cases.

BRIEF SUMMARY

In an exemplary embodiment, an apparatus includes one or more processors, and one or more memories including computer program code. The one or more memories and the computer program code are configured to, with the one or more processors, cause the apparatus to perform at least the following: selecting a reception path to use to receive information from a first receiver path through a first receiver portion in a transceiver portion of the apparatus or from a second receiver path in a receiver portion separate from the transceiver portion of the apparatus, wherein both of the first and second receiver paths receive the information using a same frequency band of a same radio access technology; and receiving the information using the selected reception path.

In another exemplary embodiment, a method is disclosed that includes the following: selecting a reception path to receive information from a first receiver path through a first receiver portion in a transceiver portion of an apparatus or from a second receiver path in a receiver portion separate from the transceiver portion of the apparatus, wherein both of the first and second receiver paths receive the information using a same frequency band of a same radio access technology; and receiving the information using the selected reception path.

In a further exemplary embodiment, a computer program product is disclosed that includes a computer-readable memory medium bearing computer program code embodied therein for use with a computer. The computer program code includes the following: selecting a reception path to receive information from a first receiver path through a first receiver portion in a transceiver portion of an apparatus or from a second receiver path in a receiver portion separate from the transceiver portion of the apparatus, wherein both of the first and second receiver paths receive the information using a same frequency band of a same radio access technology; and receiving the information using the selected reception path.

In an additional exemplary embodiment, an apparatus includes one or more processors and one or more memories including computer program code. The one or more memories and the computer program code are configured to, with the one or more processors, cause the apparatus to perform at least the following: transmitting first information using a transmission frequency band of a radio access technology over a transmission path in transceiver; for the radio access technology and a reception frequency band corresponding to the transmission frequency band, receiving second information over a receiver path in a secondary receiver, where the transceiver does not have a receiver path configured to receive the reception frequency band of the radio access technology.

In a further exemplary embodiment, a method is disclosed that includes transmitting first information using a transmission frequency band of a radio access technology over a transmission path in a transceiver, wherein a band of the radio access technology comprises a reception frequency band and the transmission frequency band; and for the radio access technology and the reception frequency band, receiving second information over a receiver path in a secondary receiver, where the transceiver does not have a receiver path configured to receive the reception frequency band of the radio access technology.

In yet a further exemplary embodiment, computer program product is disclosed that includes a computer-readable memory medium bearing computer program code embodied therein for use with a computer. The computer program code includes transmitting first information using a transmission frequency band of a radio access technology over a transmission path in a transceiver, wherein a band of the radio access technology comprises a reception frequency band and the transmission frequency band; and for the radio access technology and the reception frequency band, receiving second information over a receiver path in a secondary receiver, where the transceiver does not have a receiver path configured to receive the reception frequency band of the radio access technology.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION OF THE DRAWINGS

Figure 1:
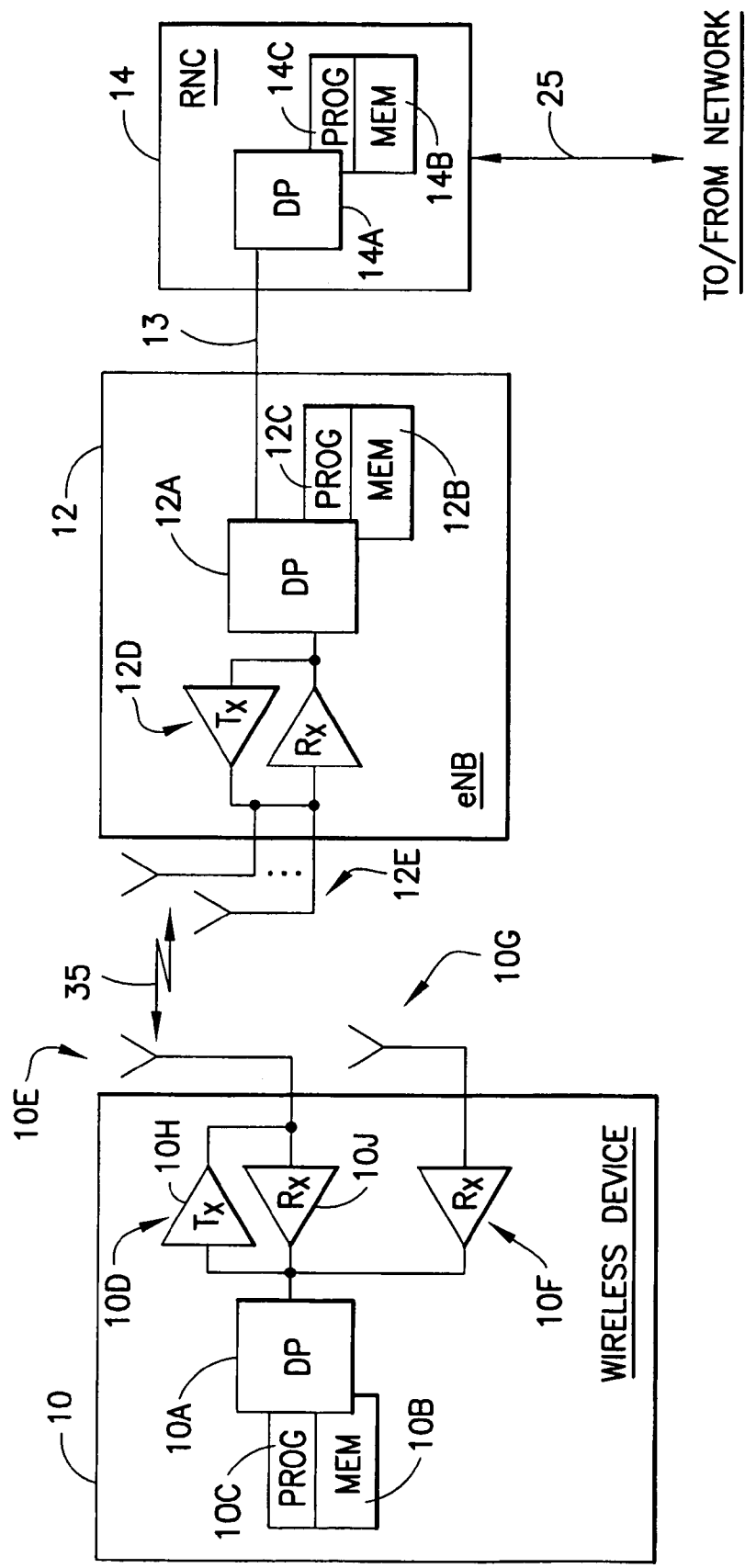
FIG. 1 is a block diagram of an exemplary system in which the exemplary embodiments may be used.

It is helpful to describe an exemplary system into which exemplary embodiments might be used. Turning to FIG. 1, a system is shown that includes a wireless device 10 communicating with an evolved Node B (eNB) via a radio link 35.

The wireless device 10 includes a controller, such as a computer or a data processor (DP) 10A, and a computer-readable memory medium embodied as a memory (MEM) 10B that stores a program of computer instructions (PROG) 12C. The wireless device 10 also includes a transceiver 10D having an associated antenna 10E (and a transmitter 10H and a receiver 10J), and a secondary receiver 10F having an associated antenna 10G. Exemplary embodiments of the instant invention involve transceiver 10D, its associated antenna 10E, the secondary receiver 10F, and its associated antenna 10G, as will be explained in more detail below.

The system includes a cellular network access node commonly called a base station (e.g., an eNB, an "evolved" Node B or E-UTRAN, evolved universal terrestrial radio access network). The eNB 12 may be a Node B, which is a particular type of base station in UTRAN (universal terrestrial radio access network), or any other access node suitable for the environment. The eNB 12 is connected via an interface 13 to a radio network controller (RNC) 14 that in turn is connected via an interface 25 to a core network (not shown) typically containing a SGSN (serving general packet radio service support node) and a GGSN (gateway general packet radio service support node) and then through the core network to, e.g., the Internet (not shown).

The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the wireless device 10 using one or more antennas 12E (multiple antennas are shown in FIG. 1). The RNC 14 includes a controller, such as a computer or a data processor (DP) 14A and a computer-readable memory medium embodied as a memory (MEM) 14B that stores a program of computer instructions (PROG) 14C.

The PROG 10C (and any other program described herein) may include program instructions that, when executed by the DP 10A, enable the wireless device 10 to operate in accordance with the exemplary embodiments of this invention, as will be discussed below in greater detail. That is, the exemplary embodiments of this invention may be implemented at least in part by computer software executable by a DP, or by hardware, or by a combination of software and hardware (and firmware).

In general, the various embodiments of the wireless device 10 can include, but are not limited to, cellular telephones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEM 10B (and any other memories described herein) may be of any type suitable to the local technical environment and may be implemented using any suitable data storage technology, such as semiconductor based memory devices, flash memory, magnetic memory devices and systems, optical memory devices and systems, fixed memory and removable memory. The DP 10A (and any other processors described herein) may be of any type suitable to the local technical environment, and may include one or more of general purpose computers, special purpose computers, microprocessors, digital signal processors (DSPs) and processors based on a multi-core processor architecture, as non-limiting examples.

Figure 2:
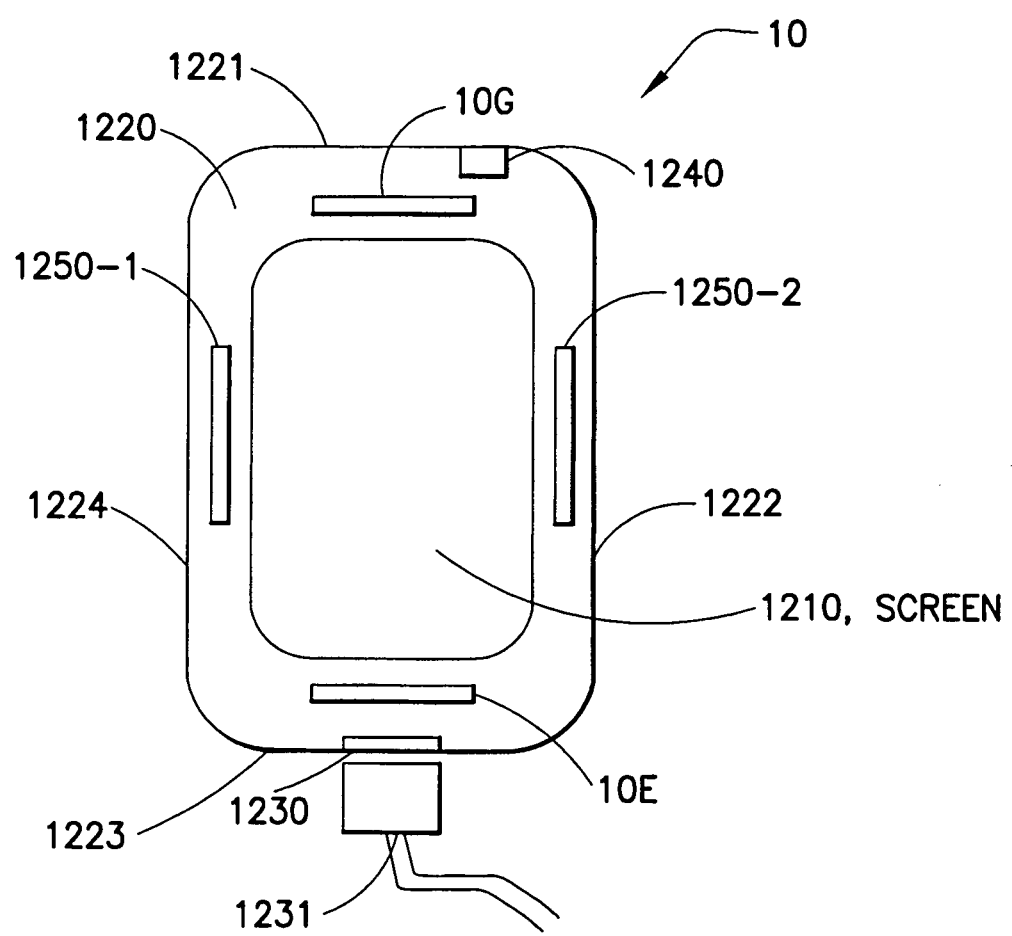
FIG. 2 is an example of a wireless device.

Turning to FIG. 2, an example of a wireless device 10 is shown. In this example, the wireless device 10 has antenna 10G situated near a "top" 1221 of the wireless device 10. The antenna 10G is situated interior to a case 1220. The antenna 10E is situated near a "bottom" 1223 of the wireless device 10. The antenna 10E is situated interior to the case 1220. The screen 1210 is used to present information to a user. There is a USB connector 1230 that is used to, e.g., charge the wireless device 10 and to transfer information to and from the wireless device. There are also two proximity sensors 1250-1, 1250-2, near the left 1224 and right 1222 sides of the wireless device 10, also situation interior to the case 1220. The proximity sensors 1250 are used to determine whether a part (e.g., head, hand) of a user is proximate the wireless device 10. The antennas 10G, 10E may also be implemented as proximity sensors, in addition to or in place of the proximity sensors 1250. There is also an ambient light sensor, 1240.

Many of the problems described above may be ameliorated or eliminated with a secondary receiver 10F, outside the transceiver 10D. With applications with an additional secondary receiver 10F, like LTE (e.g., MIMO) and HSPA+ (e.g., diversity), there may be a relevant use case to operate also with one receiver instead of using both receivers (i.e., receiver 10H in the transceiver 10D and the secondary receiver 10F). Such use cases are described in more detail below.

In an exemplary embodiment, the secondary receiver 10F and its associated hardware and antenna 10G may be optimized for reception only. A suitable RF filter is therefore a reception band filter with lower loss than typically in a duplex filter. A duplex filter may be used in the transceiver 10D. The secondary receiver 10F could have better sensitivity than the receiver 10J in the transceiver 10D.

For example, in normal voice call mode, there may be no need to use two receivers 10J, 10F simultaneously. This may also be a power consumption issue, in that one receiver should use less power than two receivers. If the secondary receiver path is used as the receiver in this case, sensitivity improvement is expected since (as described above and in more detail below), e.g., the second receiver path may be optimized more than the primary receiver path for the particular frequency band and radio access technology being used.

Further, the antenna 10E for the transceiver 10D may be optimized for transmission frequencies. Therefore, there is a possibility to improve reception and transmission OTA performance at the same time. As described above and in more detail below, the reception can be improved because the secondary receiver path may be optimized for reception for, e.g., a particular frequency band and radio access technology, while the transmitter may be optimized to transmit the particular frequency band and radio access technology.

Secondary receiver path in the secondary receiver 10F is routed via separate bandpass reception filter(s) where insertion loss is better than in duplexer in the transceiver path. Reception bandpass filter of secondary receiver chain is not heated because of transmission power, as a duplexer in the transceiver 10D would be. That is, if the receiver path in the transceiver 10D is used for a full duplex system, a duplexer in the transceiver 10D would be used for both transmission and reception of a frequency band for a radio access technology and therefore the duplexer is heated because of the power used for transmission. Insertion loss and receiver sensitivity remains good with high transmission powers also. Antenna isolation between "main" (10E) and secondary (10G) antennas helps also to avoid receiver desensitization caused by transmission. Antenna switch loss may be smaller in the secondary receiver chain, because the switch is simpler and does not need to be designed for high transmission powers.

In addition to that, separation of transmitter and receiver front ends gives additional benefits, such as benefits to third order spurious responses causing receiver desensitization in full duplex systems.

Implementation is performed in exemplary embodiments, so that the best performance or best receiver 10J, 10F could be used in different situations for different operating bands. If the secondary receiver 10F gives better OTA performance than main receiver 10J in some bands and their corresponding radio access technologies, the secondary receiver 10F could be used instead of the main receiver 10J to receive information.

Selection of which chain is used as main reception path and which as secondary reception path may be defined, e.g., during a research and development phase separately for different bands and their radio access technologies, and taken into account in final product software.

OTA performance optimization will typically be performed anyway before mass-production and the embodiments described above would provide additional options and increased potential to fulfill OTA requirements for reception and transmission for different use cases.

Different use cases may be, as examples, the following:
 free space (that is, no user proximity);
 in hand (e.g., the wireless device is proximate the hand of the user);
 beside head (e.g., the wireless device is proximate the head of the user);
 beside head with hand (e.g., the wireless device is proximate the head and the hand of the user); or
 USB cable connected/not connected.

Different sensors, like proximity sensors 1250 and/or ambient light sensors 1240, could be used to indicate the use case. The receiver chain selection may be performed differently in different use-cases. Regarding the USB cable use case, if the USB connector is near one of the antennas (in FIG. 2, the USB connector 1230 is near the "main" antenna 10E), the USB cable 1231 may affect antenna performance at least when the USB cable 1231 is connected. More specifically, a USB cable connection (and USB data traffic) near the antenna 10E may cause interference. Furthermore, a USB cable connection may degrade receiver performance also when there is no USB data traffic: the USB cable connection mistunes the antenna impedance and loads the antenna. So there could be an interference problem (with USB cable 1231 powered and used for data traffic) and an antenna mistuning problem (with the USB cable 1231 connected to the connector 1230). In this case, it would be beneficial to use another reception pathway through another receiver, such as the secondary receiver 10F for reception.

This all helps to achieve better OTA performance for reception. In addition, if the main antenna 10E is optimized for transmission frequencies, the main antenna reception performance may be compromised, but this is possible and acceptable if the antenna 10E is thought to be the secondary antenna in LTE MIMO and HSPA+ diversity modes, where two receivers are active simultaneously. In an operation mode with one active receiver, the antenna 10E may be not used at all for reception.

The systems described herein may use multiple radio access technologies. It is noted that a radio access technology (RAT) is, e.g., a unique air/radio interface defined by, for instance, a combination of resources (e.g., carriers having certain frequency ranges), resource spaces (e.g., subcarriers and symbols), and modulations. In the instant disclosure, the exemplary radio access technologies described include GSM (global system for mobile communications), WCDMA (wideband code division multiple access), and LTE (long term evolution). LTE uses OFDMA for downlink (from eNB 12 to wireless device 10) and the uplink (from wireless device 10 to eNB 12) access technique is SC-FDMA. For instance, reference may be made to the following: (1) 3GPP TS 36.300, V8.11.0 (2009-12), 3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8); (2) 3GPP TS 36.101 V8.7.0 (2009-09), 3rd Generation Partnership Project; Technical Specification Group Radio Access Network; Evolved Universal Terrestrial Radio Access (E-UTRA); User Equipment (UE) radio transmission and reception (Release 8); (3) 3GPP TS 36.101 V9.1.0 (2009-09), 3rd Generation Partnership Project; Technical Specification Group Radio Access Network; Evolved Universal Terrestrial Radio Access (E-UTRA); User Equipment (UE) radio transmission and reception (Release 9). However, the instant invention is not limited to these. Because these radio access technologies also operate on different frequency bands, the frequency bands will also be used along with the particular radio access technology to distinguish from other possible frequency bands over which a particular radio access technology may operate.

Illustrative examples of the bands for these radio access technologies include the following:

GSM: 850 MHz (mega-Hertz) (Band5), 900 MHz (Band8), 1800 MHz (Band3), and 1900 MHz (Band2);
LTE BAND4:
Transmitter (TX), 1710-1755 MHz; and
Receiver (RX), 2110-2155 MHz;
LTE BAND 17:
Transmitter, 704-716 MHz; and
Receiver, 734-746 MHz;
WCDMA BAND2:
Transmitter, 1850-1910 MHz; and
Receiver, 1930-1990 MHz;
WCDMA BAND1:
Transmitter, 1920-1980 MHz; and
Receiver, 2110-2170 MHz;
WCDMA BAND5:
Transmitter, 824-849 MHz; and
Receiver, 869-894 MHz.

That is, for a particular radio access technology, a particular band may have separate transmission and reception frequency bands (e.g., WCDMA BAND5) or may have the same transmission and reception frequency bands (e.g., GSM). The bands and radio access technologies described above are merely exemplary.

Figure 3:
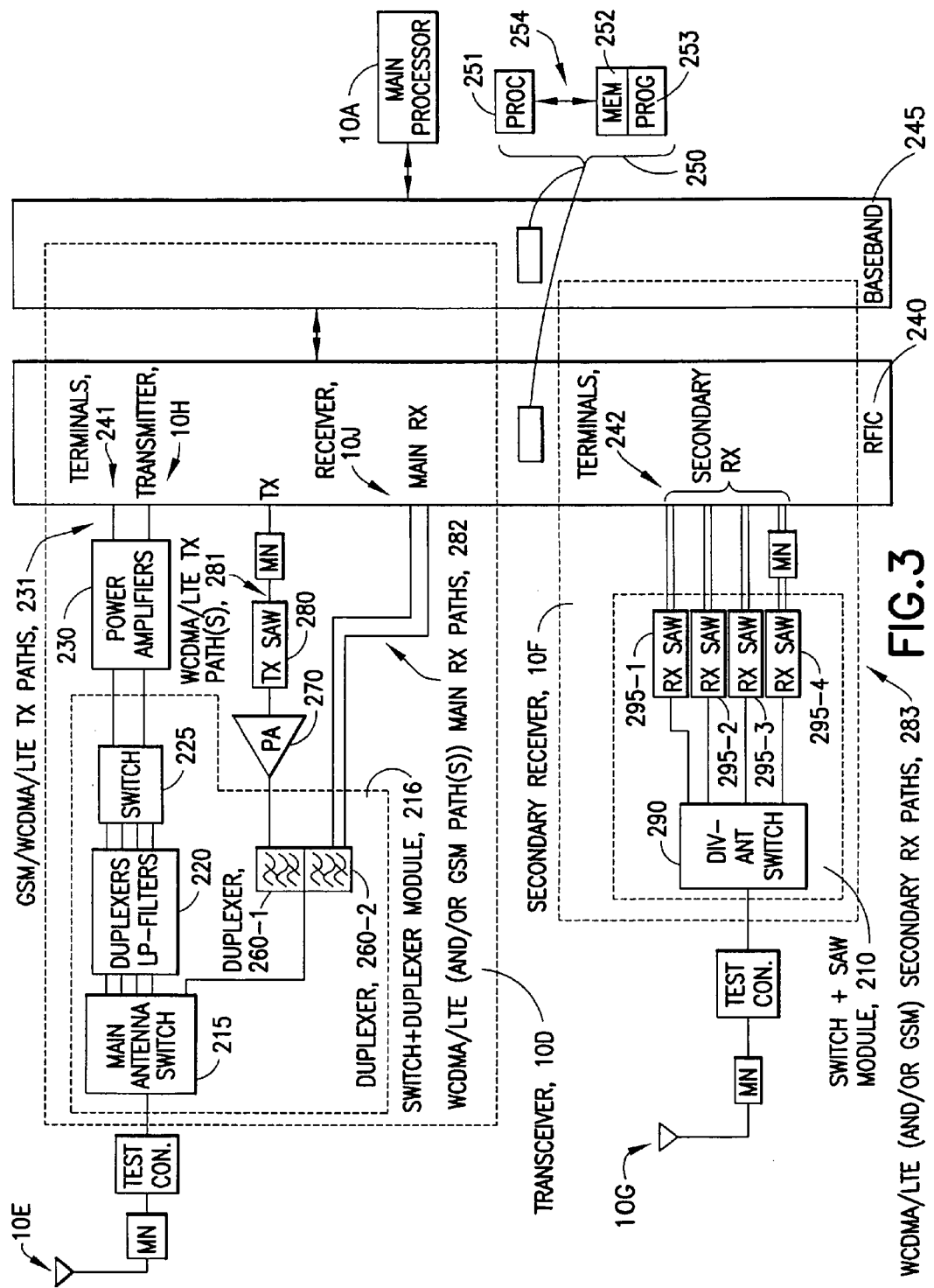
FIG. 3 is an example of a portion of a wireless device in accordance with an exemplary embodiment of the instant invention.

Referring now to FIG. 3, FIG. 3 is an example of a portion of a wireless device 10 in accordance with an exemplary embodiment of the instant invention. This portion includes the transceiver 10D, shown in this example as having a portion between the antenna 10E to terminals 241 on the RFIC 240, a portion in the RFIC 240, and a portion in the baseband circuitry 245. Similarly, the secondary receiver 10F has a portion between the antenna 10G and the terminals 242 on the RFIC 240, a portion in the RFIC 240, and a portion in the baseband circuitry 245.

The RFIC is typically an off-the-shelf part that contains circuitry used to accept baseband information and make the information suitable for transmission (e.g., modulate the information onto one or more carriers, perform spreading, etc.) and also performs the reverse for reception (e.g., takes signals from one or both of the receivers 10J, 10F, demodulates or despreads the corresponding information, etc., and produces baseband information). The baseband circuitry 245 communicates with the main processor 10A and the RFIC 240 to receive or transmit information. The baseband circuitry may add or remove error correcting codes, for instance, or apply other processing known to those skilled in this area.

Each of the RFIC 240 and the baseband circuitry 245 can also include control circuitry 250 that in this example includes one or more processors 251 and one or more memories 252 coupled via one or more buses 254. The memories 252 can include programs 253. The operations described herein may be performed by any of the processors 251, 10A. The control circuitry 250 may also include, e.g., circuitry in an integrated circuit defined to carry out one or more of the operations described herein, or circuitry of the RFIC 240 or baseband circuitry 245 (or both) that is configured by firmware to carry out one or more of the operations described herein.

The transceiver 10D includes power amplifiers 230, a switch 225, duplexers and LP (low pass) filters circuitry 220 (a "duplexer" is a duplex filter in this example), a main antenna switch 215, two duplexers 260-1, 260-2, a power amplifier (PA) 270, and a TX SAW 280. The switches 215, 225 are under control of, e.g., a processor to couple one or more of the paths 231, 281, 282 to the antenna 10E. In the figure, "MN" is a matching network and the "Test Con." is a test connector. The transceiver 10D includes GSM/WCDMA/LTE TX paths 231, WCDMA/LTE TX path(s) 281 and WCDMA/LTE RX path(s) 282. In the case of GSM, the transmitter signal passes through LP filters in the duplexers and LP filters circuitry 220, while for WCDMA/LTE the transmitter signal passes through the duplexers in the duplexers and LP filters circuitry 220. In this example, only one (e.g., single-ended) WCDMA/LTE TX path 281 and one (e.g., balanced) WCDMA/LTE RX path 282 are shown for simplicity, but typically there would be multiple WCDMA/LTE TX paths 281 and multiple WCDMA/LTE RX paths 282. The band content depends on the target market of the wireless device. The switch and duplexer module 216 could be integrated to a front-end module. The power amplifiers 230 could be integrated in PA module.

The secondary receiver 10F includes four (in this example) RX SAWs 295-1, 295-2, 295-3, and 295-4 and a Div-ant-switch 290 (a switch under control of a processor to select which path will be coupled to the antenna 10G). Each RX SAW 295 corresponds to one WCDMA/LTE secondary RX paths 283, and therefore four paths 283 are shown. A secondary receiver 10F is needed for all LTE Bands and all WCDMA HSPA+ bands supporting diversity reception. The band content depends on the target market of the wireless device. The switch 290 and the RX SAW filters 295 (as a module 210) could be integrated to a diversity front-end module. It is noted that in some instances, GSM reception paths may also be included in the transceiver 10D.

Although primary discussion herein is related to versions wherein the same frequency band for the same radio access technology is used for both receiver paths 282, 283, there are other possibilities, as the discussion that follows shows. For example, in a multi-band product for U.S. market, included bands could include the following four GSM bands: GSM850, GSM900, GSM1800, and GSM1900. Typically, GSM uses main receiver 10J and the main antenna 10E in the transceiver 10D. Because there is an LTE or WCDMA system available at same frequency area with all GSM bands (GSM850=BAND5, GSM900=BAND8, GSM1800=BAND3, GSM1900=BAND2), it could be possible to use this idea also at the GSM side, if there is LTE/WCDMA secondary receiver included at corresponding band and performance of secondary RX path 283 is better than performance of transceiver GSM RX path 282. That is an LTE/WCDMA path 283 covering the same frequency band as GSM would be used to receive GSM information.

Additionally, the TX SAW 280 between the PA 270 and the RFIC 240 can be removed in certain situations, as this is an optional component with some chipset suppliers. In the transceiver 10D, the power amplifier(s) module 230 between RFIC 240 and the switch 225 switch could be common for GSM/WCDMA/LTE bands. That is, the GSM TX paths 231 could be combined with the WCDMA/LTE TX paths 281, such that there would be GSM/WCDMA/LTE paths instead of two separate paths 231, 281.

Figure 4:
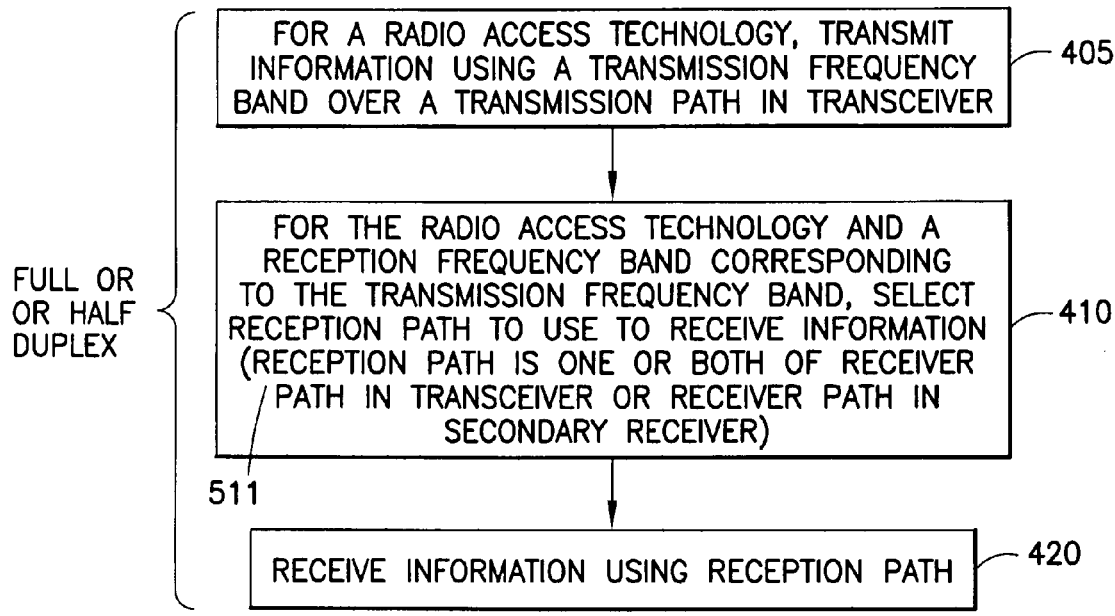
FIG. 4 is a block diagram of a method performed by a wireless device in accordance with an exemplary embodiment of the instant invention.

Referring now to FIG. 4, a block diagram is shown of a method performed by a wireless device in accordance with an exemplary embodiment of the instant invention. FIGS. 4-7 are embodiments where a reception path for a particular frequency band and a corresponding radio access technology is in both the transceiver 10D (e.g., one of the WCDMA/LTE main RX paths 282) and the secondary receiver 10F (e.g., one of the WCDMA/LTE secondary receiver paths 283). The method includes, in block 405, for a radio access technology, transmitting information using a transmission frequency band over a transmission path 281 (or, in some embodiments, GSM TX paths 231) in the transceiver 10D. In block 410, for the radio access technology and a reception frequency band corresponding to the transmission frequency band, a reception path is selected to use to receive information. As described above, for a particular radio access technology, a particular band may have separate transmission and reception frequency bands (e.g., WCDMA BAND5) or may have the same transmission and reception frequency bands (e.g., GSM). That is the reception frequency band corresponds to the transmission frequency band because both the reception and transmission frequency bands are defined based on the band for the radio access technology. A reception path is a receiver path 282 in the transceiver 10D, a receiver path 283 in the secondary receiver 10F, or both a receiver path 282 in the transceiver 10D and a receiver path 283 in the secondary receiver 10F. In block 420, information is received using reception path. It is noted that the method shown in FIG. 4 can be performed in full duplex (both transmission and reception occurring at least in part at the same time) or in half duplex (transmission and reception occur at different times).

Figure 5:
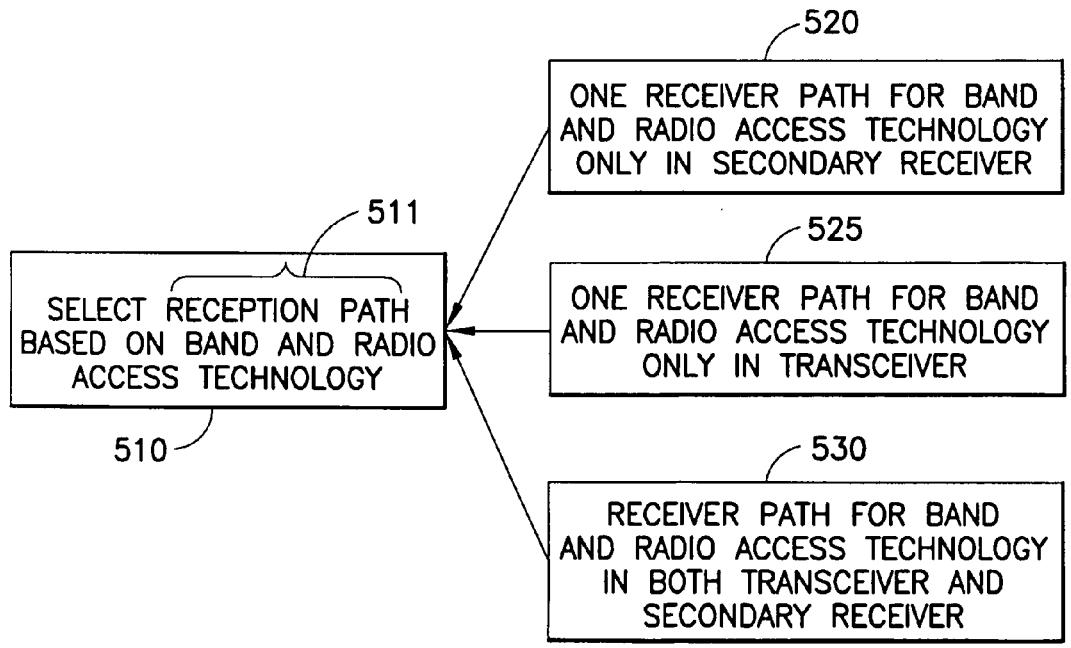
FIGS. 5-7 are block diagrams of methods for performing a block from FIG. 4.
Figure 6:
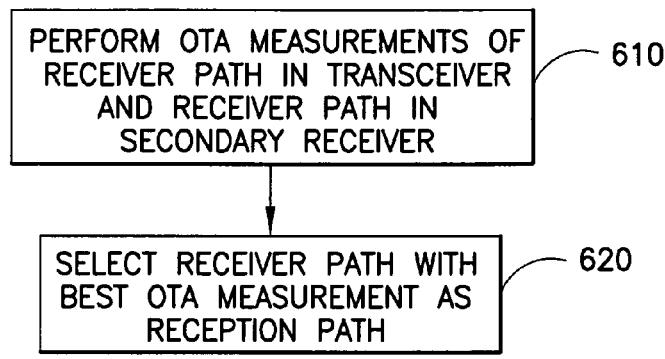
Figure 7:
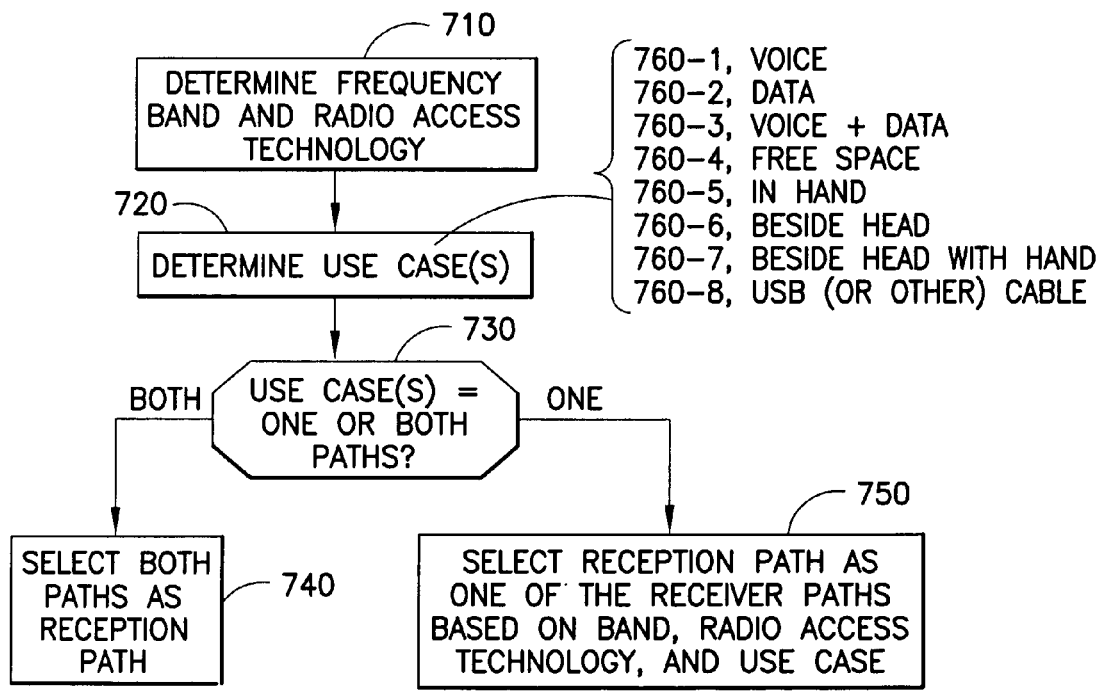

FIGS. 5-7 are block diagrams of methods for performing block 410 from FIG. 4. For instance, in FIG. 5, in block 510, the reception path 511 is selected based on band and radio access technology. In block 520, one receiver path 283 is selected as the reception path 511 for the appropriate band and radio access technology in the secondary receiver 10F. For instance, if LTE BAND17 is being used, the transmission path 281 will use 704-716 MHz (using SC-FDMA) and the reception path 283 will use 734-746 MHz (using OFDMA). In block 525, one receiver path 282 is chosen as the reception path 511 for the band and radio access technology in the transceiver 10D. That is, for a particular radio access technology and corresponding band such as LTE BAND17, it may be that one of the receiver paths 282, 283 is better than the other according to some criteria. This is typically determined to be the case during the research and development stage of the wireless device 10, but may also occur at other times.

In block 530, diversity is used and the reception path 511 is chosen as both receiver paths 282, 282 for the frequency band and radio access technology in both the receiver 10J of the transceiver 10D and secondary receiver 10F.

In FIG. 6, another block diagram is shown for performing block 410 of FIG. 4. In block 610, OTA measurements are performed of receiver path 282 in the receiver 10J in the transceiver 10D and the receiver path 283 in the secondary receiver 10F. Such OTA measurements may include the following, as examples: radiated transmitter power for all bands; or radiated receiver performance (e.g., over-the-air sensitivity) for all receivers/all bands. These measurements may be performed in following exemplary situations:

free space;
 in hand;
 beside head;
 beside hand and head;
 in datahand (or browsing mode hand);
 with/without USB or other cable.

Regarding the "datahand", OTA measurements are done with dummy head and hand models, commonly called "phantoms". These are models of human head and hand. Depending on the size of the mobile device, the hand model could be different for voice call mode and browsing mode (the latter also called "datamode"), so there could be a separate "datahand" model corresponding to the browsing mode. Based on the OTA measurements, in block 620, one of the receiver paths 282, 283 is selected that has the best OTA measurement.

Turning now to FIG. 7, another block diagram is shown for performing block 410 of FIG. 4. In block 710, the frequency band and radio access technology are determined. In block 720, the use case is determined. Exemplary use cases 760 include voice 760-1, data 760-2, voice and ("+") data 760-3, free space 760-4, in hand 760-5, beside head 760-6, beside head with hand 760-7, USB (or other) cable 760-8 plugged in. Certain examples of use cases 760 are as follows.

Consider the following frequency bands in WCDMA: BAND1, BAND2 and BAND5. In WCDMA HSPA+ mode with diversity, both receiver paths 282, 283 are in use (e.g., in a "data mode"). Currently, most of WCDMA phones that are commercially available do not include a secondary receiver 10F and both modes voice call and "data call" use only one receiver 10J. With two receivers 10J, 10F, there is not always need to use both receivers 10J, 10F. For example in WCDMA voice call mode, only one receiver can be in use, and the better receiver could be selected to optimize OTA performance. The better receiver could be selected via the techniques proposed in FIG. 6, or the better receiver could be determined in the research and development phase for a particular wireless device 10.

Use of two receivers improves data rates, but this may not be needed in a voice call for instance. Thus, if the use case is voice 760-1, the secondary receiver 10F, which in an exemplary embodiment is optimized for reception for at least WCDMA frequency bands, is selected (block 730) and is used (block 750) to receive information and the receiver 10J is not used.

As another example, consider the following LTE frequency bands: BAND4, BAND17. Both receivers 10J, 10F are in use to optimize data rates, when transmitting/receiving data (use case 760-2). Thus, both receivers 10J, 10F would be selected (block 750) based on the use case (block 730). There could/will be need to use LTE system also for voice calls (VoLTE=Voice over LTE), and therefore only one of the receivers 10J, 10F would be used to receive information in this use case 760-1. That is, in that case, only one receiver 10J or 10F could be potentially selected (block 740) based on (block 730) the use case of voice 760-1, as voice transfer does not need as much capacity relative to typical data transfers. Then, the better receiver could be used, and battery time saved when compared to use of both receivers.

The use case of voice and data 760-3 may also used to select (blocks 730, 740, 750) one or both receivers 10J, 10F (e.g., diversity reception might be required for reception of voice and data).

Regarding the use cases 760-4 to 760-7, these correspond to locations where the wireless device 10 could be relative to human proximity. The locations could be determined using, e.g., the proximity sensors 1250 and/or ambient light sensors 1240 could be used to indicate a use case. For instance, a proximity sensor 1250 may indicate a change in an electromagnetic field because of human proximity in certain locations, and a processor could use data from the proximity sensor 1250 to determine human proximity relative to the wireless device 10. Similarly, this data may be used, e.g., in conjunction with data from an ambient light sensor 1240 to determine human proximity relative to the wireless device 10. For instance, in the example of FIG. 2, if the ambient light sensor 1240 indicates that the amount of light has decreased recently while a user placed a voice call, a processor could determine the wireless device is beside the head 760-6 of the user. If this is combined with data from the proximity sensors 1250-1, 1250-2, both of which indicate user proximity, a processor could determine the wireless device 10 is beside the head with a hand 760-7.

Based on these particular use cases 760-4 to 760-7, one or both receiver paths are selected as the reception path 511. The receiver path 282, 283 is selected for a use case 760-4 to 760-7 based on measurements taken during the research and development phase for a particular wireless device 10. Main antenna 10E and secondary antenna 10G are typically in different parts of a wireless device 10. For example, if the main antenna 10E is at bottom of the wireless device 10 and the secondary antenna 10G on top of the wireless device 10 (see FIG. 2), there is a difference how much a hand or a hand and a head together degrades antenna efficiency. The bigger the antenna efficiency degradation, the worse is receiver radiated sensitivity.

That is, having the hand and head near the main antenna 10E is causing RF signal absorption (to hand and to head) and also mistuning antenna impedance. So performance degradation occurs because of absorption and additional mismatch. For example, the hand may heavily load the bottom mounted main antenna 10E (see FIG. 2) but not load the top mounted secondary antenna 10G as much. Based on measurements taken, e.g., during the research and development stage, one of the receiver paths 282, 283 would be selected (blocks 730, 750) based on the use case and the frequency band and radio access technology.

Regarding use case 760-8, where a USB (or other cable) is plugged in, the best position in certain cases for a USB cable connector is near the same area where the position of the main antenna 10E is in many cases. When the USB cable is connected, this may cause antenna performance degradation. It could therefore be beneficial to use the secondary receiver 10F and secondary antenna 10G, when USB cable is connected in a wireless device 10 such as that shown in FIG. 2). For example, when a voice call occurs during battery charging via USB.

It is noted that use cases 760 that require diversity (e.g., data 760-2 or voice and data 760 use cases) may override use cases 760 using single receivers. For instance, if a use case 760 such as use case 760-6 ("in hand") indicates one receiver path should be chosen, but the use case of data 760-2 is also valid and requires both receivers 10J, 10F, the use case 760-2 would override the use case 760-6.

Figure 8:
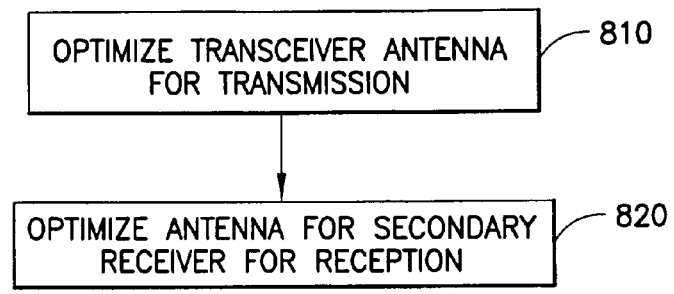
FIG. 8 is a block diagram of a method performed to a wireless device in accordance with an exemplary embodiment of the instant invention.

FIG. 8 is a block diagram of a method performed to a wireless device in accordance with an exemplary embodiment of the instant invention. The block diagram shown in FIG. 8 is performed during the research and development stage for a wireless device 10. In the example of FIG. 8, there are two receiver paths 282, 283 for one or more frequency bands for one or more radio access technologies. A designer would, in block 810, therefore optimize a transceiver antenna 10E for transmission over the frequency bands that would be in use. For instance, a designer could optimize an antenna matching circuit so that best matching is achieved for transmission. In another example, for the case of an active antenna, the designer could optimize or use an antenna tuning circuit so that TX performance is optimized. As another example, the antenna/radiator element itself may be detuned so that resonance and efficiency is optimized at transmission frequencies.

In block 820, a designer optimizes a receiver antenna 10G for reception over the frequency bands that would be in use. The secondary RX antenna 10G should be optimized for a receiver in any case. The options described for block 810 are suitable here, too, for this optimization. In the situation that the main antenna 10E and main receiver 10J work well for one RX band (e.g., BAND X), but not as well for another RX band (e.g., BAND Y), there could be possibility to optimize/improve secondary RX antenna 10G more to BAND Y and let the secondary antenna for RX BAND X be a little worse.

Figure 9:
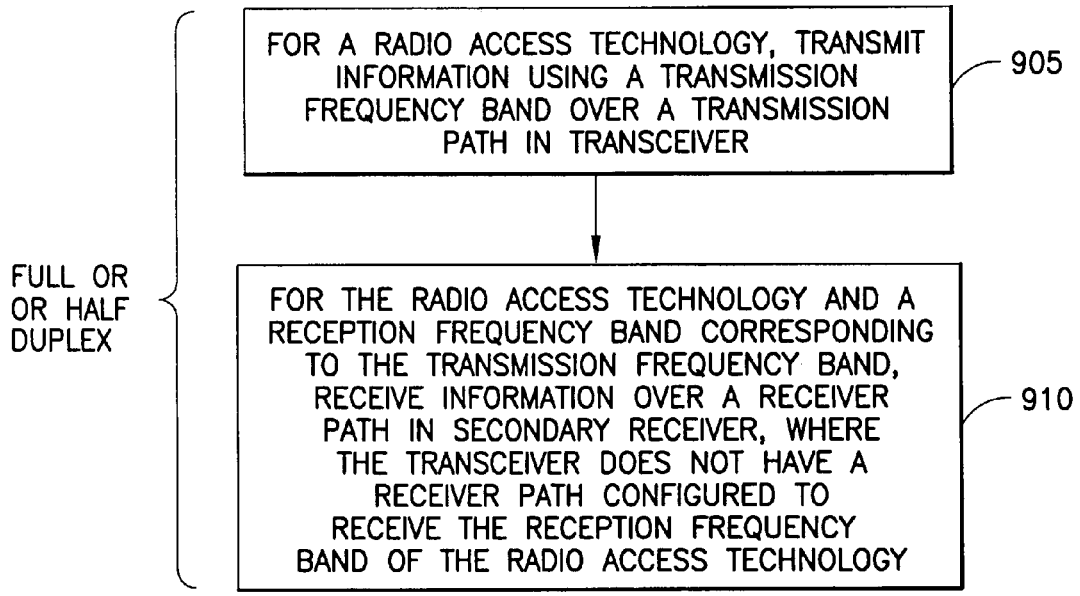
FIG. 9 is a block diagram of a method performed by a wireless device in accordance with another exemplary embodiment of the instant invention.

Referring to FIG. 9, a block diagram of a method is shown that is performed by a wireless device in accordance with another exemplary embodiment of the instant invention. In FIG. 9, the secondary receiver 10F has a secondary RX path 283 for a frequency band and radio access technology where no equivalent main RX path 282 exists. That is, there is no path 282 in the transceiver 10D used for reception for this particular frequency band and radio access technology. For those radio access technologies where diversity is not necessary, such as for GSM and WCDMA without diversity, it may be beneficial to receive only using a receiver path 283. That is, no equivalent main RX path 282 would exist in the transceiver 10D although the receiver 10J would still have main RX paths 282 for other frequency bands of other radio access technologies.

Therefore, in block 905, for a radio access technology, information is transmitted using a transmission frequency band over a transmission path in transceiver. In block 910, for the radio access technology and a reception frequency band corresponding to the transmission frequency band, information is received over a receiver path 283 in the secondary receiver 10F. The transceiver 10D does not have a receiver path 282 configured to receive the reception frequency band of the radio access technology.

Without in any way limiting the scope, interpretation, or application of the claims appearing below, a technical effect of one or more of the example embodiments disclosed herein is to select a reception path for one or both receiver paths 282, 283 based on use cases. Another technical effect of one or more of the example embodiments disclosed herein is to optimize an antenna for a transceiver for transmission and to optimize an antenna for a secondary receiver and therefore provide an improvement in reception in certain cases (as compared to a wireless device where the antennas are not optimized for their respective operations).

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIGS. 1 and 3. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims

What is claimed is:

1. An apparatus comprising:
   one or more processors; and
   one or more memories including computer program code, the one or more memories and the computer program code configured to, with the one or more processors, cause the apparatus to perform at least the following:
   selecting a reception path to use to receive information from a first receiver path through a first receiver portion in a transceiver portion of the apparatus or from a second receiver path in a receiver portion separate from the transceiver portion of the apparatus, wherein both of the first and second receiver paths receive the information using a same frequency band of a same radio access technology, wherein selecting further comprises selecting the reception path based on a use case; and
   receiving the information using the selected reception path.

2. The apparatus of claim 1, implemented on an integrated circuit.

3. The apparatus of claim 1, wherein:
   selecting further comprises selecting both the first and second receiver paths; and
   receiving further comprises receiving the information using both the first and second receiver paths.

4. The apparatus of claim 1, wherein the use case corresponds to reception of voice, and wherein selecting further comprises selecting a predetermined one of the first receiver path or the second receiver path based on the frequency band of the radio access technology.

5. The apparatus of claim 1, wherein the use case corresponds to proximity to a human to the apparatus, and wherein selecting further comprises selecting a predetermined one of the first receiver path or the second receiver path based on the frequency band of the radio access technology and the proximity of the human to the apparatus.

6. The apparatus of claim 5, wherein the proximity of the human to the apparatus is one of the following: free space; in hand; beside head; or beside head with hand.

7. The apparatus of claim 1, further comprising a connector, and wherein a use case corresponds to a cable being plugged into the connector, wherein the cable interferes with reception using a first antenna coupled to one of the first or second receiver paths and, in response to the cable being plugged in, selecting further comprises selecting a different one of the first or second receiver paths, wherein the different receiver path is coupled to a second antenna spaced apart from the first antenna.

8. The apparatus of claim 1, wherein the control circuitry is further configured to cause the apparatus to perform the operation of determining over the air measurements for both the first and second receiver paths, and wherein selecting further comprises selecting one of the first receiver or the second receiver path with a best over the air measurement.

9. The apparatus of claim 1, wherein:
   the first receiver path is coupled to a first antenna and the first antenna is optimized for transmission for a first frequency band for a radio access technology; and
   the second receiver path is coupled to a second antenna and second antenna is optimized for reception for a second frequency band corresponding to the first frequency band for the radio access technology.

10. The apparatus of claim 1, wherein the transceiver further comprises a transmitter that transmits a frequency band of the global system for mobile communications radio access technology, and the second receiver path is configured to be used to receive both the frequency band of the global system for mobile communications radio access technology and a frequency band for one of a wideband code division multiple access radio access technology or a long term evolution radio access technology radio access technology.

11. The apparatus of claim 1, wherein the apparatus comprises a wireless device.

12. A computer program product comprising a computer-readable memory medium bearing computer program code embodied therein for use with a computer, the computer program code comprising:
   selecting a reception path to receive information from a first receiver path through a first receiver portion in a transceiver portion of an apparatus or from a second receiver path in a receiver portion separate from the transceiver portion of the apparatus, wherein both of the first and second receiver paths receive the information using a same frequency band of a same radio access technology, wherein selecting further comprises selecting the reception path based on a use case; and
   receiving the information using the selected reception path.

13. The computer program product of claim 12, wherein the use case corresponds to proximity to a human to the apparatus, and wherein selecting further comprises selecting a predetermined one of the first receiver path or the second receiver path based on the frequency band of the radio access technology and the proximity of the human to the apparatus.

14. A method, comprising:
   selecting a reception path to receive information from a first receiver path through a first receiver portion in a transceiver portion of an apparatus or from a second receiver path in a receiver portion separate from the transceiver portion of the apparatus, wherein both of the first and second receiver paths receive the information using a same frequency band of a same radio access technology, wherein selecting further comprises selecting the reception path based on a use case; and
   receiving the information using the selected reception path.

15. The method of claim 14, wherein:
   selecting further comprises selecting both the first and second receiver paths; and
   receiving further comprises receiving the information using both the first and second receiver paths.

16. The method of claim 14, wherein the use case corresponds to reception of voice, and wherein selecting further comprises selecting a predetermined one of the first receiver path or the second receiver path based on the frequency band of the radio access technology.

17. The method of claim 14, wherein the use case corresponds to proximity to a human to the apparatus, and wherein selecting further comprises selecting a predetermined one of the first receiver path or the second receiver path based on the frequency band of the radio access technology and the proximity of the human to the apparatus.

18. The method of claim 17, wherein the proximity of the human to the apparatus is one of the following: free space; in hand; beside head; or beside head with hand.

19. The method of claim 14, wherein a use case corresponds to a cable being plugged into a connector of the apparatus, wherein the cable interferes with reception using a first antenna coupled to one of the first or second receiver paths and, in response to the cable being plugged in, selecting further comprises selecting a different one of the first or second receiver paths, wherein the different receiver path is coupled to a second antenna spaced apart from the first antenna.

20. The method of claim 14, wherein the method further comprises determining over the air measurements for both the first and second receiver paths, and wherein selecting further comprises selecting one of the first receiver or the second receiver path with a best over the air measurement.

\* \* \* \* \*